United States Patent
Schmidt et al.

(10) Patent No.: US 11,555,340 B2
(45) Date of Patent: Jan. 17, 2023

(54) MOTOR VEHICLE LOCK

(71) Applicant: Brose Schliesssysteme GmbH & Co. KG, Wuppertal (DE)

(72) Inventors: Tatjana Schmidt, Leverkusen (DE); Serkan Guelkan, Hattingen (DE); Ludger Graute, Essen (DE)

(73) Assignee: Brose Schliesssysteme GmbH & Co. KG, Wuppertal (DE)

( * ) Notice: Subject to any disclaimer, the term of this patent is extended or adjusted under 35 U.S.C. 154(b) by 1284 days.

(21) Appl. No.: 15/809,441

(22) Filed: Nov. 10, 2017

(65) Prior Publication Data

US 2018/0187463 A1 Jul. 5, 2018

(30) Foreign Application Priority Data

Nov. 10, 2016 (DE) ..................... 20 2016 106 308.6

(51) Int. Cl.
*E05B 77/36* (2014.01)
*E05B 85/24* (2014.01)
(Continued)

(52) U.S. Cl.
CPC .............. *E05B 85/26* (2013.01); *E05B 77/36* (2013.01); *E05B 85/243* (2013.01); *E05C 3/004* (2013.01); *E05C 3/12* (2013.01)

(58) Field of Classification Search
CPC ........ E05B 85/26; E05B 85/243; E05B 77/36; E05B 81/20; E05B 81/50; E05C 3/004; E05C 3/12; B60N 2/20; B60N 2/2245
See application file for complete search history.

(56) References Cited

U.S. PATENT DOCUMENTS

| 4,880,263 A | 11/1989 | Yamada |
| 8,480,138 B2 | 7/2013 | Bendel et al. |

(Continued)

FOREIGN PATENT DOCUMENTS

| DE | 19710531 | 9/1998 |
| DE | 10123187 | 11/2002 |

(Continued)

OTHER PUBLICATIONS

European Search Report for European Patent Application No. 17200990 dated Mar. 8, 2018 (5 pages).

(Continued)

*Primary Examiner* — Kristina R Fulton
*Assistant Examiner* — Thomas L Neubauer
(74) *Attorney, Agent, or Firm* — Pauly, DeVries Smith & Deffner LLC

(57) ABSTRACT

A motor vehicle lock in a fitted state interacts with a striker. The motor vehicle lock includes an adjustable catch and an adjustable locking pawl. The catch is adjustable into a main locking state and into an opening state, and the locking pawl is adjustable into an entry state, and into a lifted state. The motor vehicle lock includes a tensioning mechanism. When the catch is in the main locking state and the locking pawl is in the entry state, the tensioning mechanism can be brought into a tensioned state in which the tensioning mechanism introduces a mechanical preload into the catch in its opening direction. The tensioning mechanism can be brought into a relaxed state, in which the preload originating from the tensioning mechanism is reduced or cancelled.

20 Claims, 4 Drawing Sheets

(51) Int. Cl.
     *E05B 85/26*    (2014.01)
     *E05C 3/00*     (2006.01)
     *E05C 3/12*     (2006.01)

(56) References Cited

U.S. PATENT DOCUMENTS

| | | |
|---|---|---|
| 9,611,677 B2 | 4/2017 | Bendel et al. |
| 11,008,786 B2 * | 5/2021 | Im ............... E05B 81/16 |
| 2003/0222462 A1 | 12/2003 | Bruce |
| 2010/0289274 A1 | 11/2010 | Shafry |
| 2016/0186468 A1 * | 6/2016 | Ilea ............... E05B 83/18 |
| | | 292/201 |
| 2017/0313210 A1 | 11/2017 | González Pérez |

FOREIGN PATENT DOCUMENTS

| | | |
|---|---|---|
| DE | 10239553 | 3/2004 |
| DE | 102004018742 | 11/2005 |
| DE | 202008005016 | 9/2009 |
| DE | 102009023014 | 12/2010 |
| DE | 102009050077 | 4/2011 |
| DE | 102013016055 | 4/2015 |
| EP | 1380715 | 1/2004 |
| JP | H05248131 | 9/1993 |
| WO | 2015090274 | 6/2015 |

OTHER PUBLICATIONS

"German Search Report," for German Patent Application No. 20 2016 106 308.6 (priority application for U.S. Appl. No. 15/809,441), dated Aug. 15, 2017 (5 pages).

* cited by examiner

MOTOR VEHICLE LOCK

CLAIM OF PRIORITY

This application claims the benefit of German Patent application No. DE 20 2016 106 308.6 filed on Nov. 10, 2016, the disclosure of which is incorporated herein by reference.

FIELD OF THE TECHNOLOGY

The disclosure relates to a motor vehicle lock and to a movable element arrangement of a motor vehicle, to which such a motor vehicle lock is assigned.

The motor vehicle lock in question serves for securing a movable element of a motor vehicle. The movable element is a motor vehicle door, for example, or a seat component of a motor vehicle or the like.

BACKGROUND

The known motor vehicle lock (DE 102 39 553 A1), from which the disclosure proceeds, is assigned to a motor vehicle door. In the fitted state the motor vehicle lock interacts with a striker pin or the like, which in one variant is arranged on the body of the motor vehicle, in order to secure the motor vehicle door. For securing engagement with the striker pin an adjustable catch is provided, to which an adjustable locking pawl is assigned. With the motor vehicle door closed, the catch is in its locking state, in which it is held by the locking pawl.

The catch of the known motor vehicle lock is preloaded in the opening direction by means of a helical spring. This spring preload is designed to ensure an adjustment of the catch into the opening state under all circumstances during the opening process. At the same time care must also be taken to ensure that when the motor vehicle door slams shut the striker encounters as little resistance as possible as it runs into the catch, in order to avoid locking noise. To prevent rattling noises at the point of engagement between the catch and the locking pawl, a catch bearing buffer is regularly provided, which acts on the striker. All in all, from an acoustic point of view the known motor vehicle lock represents a compromise at best.

SUMMARY

An object of the disclosure is to improve the known motor vehicle lock from an acoustic point of view.

Central to this is the fundamental consideration of how to additionally brace the catch in the main locking state and the locking pawl in the entry state in relation to one another, so that, when driving, rattling noises can no longer occur at the point of engagement between the catch and the locking pawl. For this purpose the motor vehicle lock is equipped with a tensioning mechanism, which serves to introduce a corresponding mechanical preload into the catch precisely when needed, that is to say when the catch is in the main locking state and the locking pawl is in the entry state.

In general terms it is proposed that when the catch is in the locking state and the locking pawl is in the entry state the tensioning mechanism can be brought into a tensioned state in which it introduces a mechanical preload into the catch in its opening direction, and that the tensioning mechanism can be brought into a relaxed state, in which the preload originating from the tensioning mechanism is reduced or cancelled.

In some embodiments, the proposed preload originates from the spring force of a spring arrangement of compact and cost-effective design.

Other various embodiments relate to advantageous variants for generating the proposed preload. By generating the preload in the manner of a wedge mechanism, it is possible to obtain high preloading forces from comparatively low spring forces.

Various embodiments relate to furnishing the tensioning mechanism with a tensioning lever, which is associated with an especially high mechanical robustness.

The proposed tensioning mechanism can otherwise be easily controlled by a suitable coupling to the motor vehicle lock, as proposed herein.

The tensioning mechanism can in principle also be used as part of other lock functions, as is proposed herein for the assisted closing function of a motor vehicle lock. Such a dual use of the tensioning mechanism basically leads to a compact and cost-effective design.

In a further teaching, a movable element arrangement having a movable element and a proposed motor vehicle lock, assigned to the movable element. Here the motor vehicle lock may be arranged on the movable element or otherwise on the motor vehicle. Reference is made to all observations concerning the motor vehicle lock which are appropriate in explaining the movable element arrangement.

An embodiment provides for a motor vehicle lock for securing a movable element of a motor vehicle, wherein the motor vehicle lock in the fitted state interacts with a striker in order to secure the movable element, wherein the motor vehicle lock comprises an adjustable catch and an adjustable locking pawl assigned to the catch, wherein the catch is adjustable into a main locking state, in which it is in secure engagement with the striker, and into an opening state, in which it releases the striker, wherein the locking pawl is adjustable into an entry state, in which it engages with the catch at a point of engagement, and holds the catch in the main locking state at the point of engagement, and into a lifted state, in which it releases the catch, wherein the motor vehicle lock comprises a tensioning mechanism, that when the catch is in the main locking state and the locking pawl is in the entry state the tensioning mechanism can be brought into a tensioned state in which the tensioning mechanism introduces a mechanical preload into the catch in its opening direction, and that the tensioning mechanism can be brought into a relaxed state, in which the preload originating from the tensioning mechanism is reduced or cancelled.

In various embodiments, with the catch in the main locking state a torque acting on the catch in the opening direction via the point of engagement generates a torque acting on the locking pawl in a lifting direction and that an interlocking pawl, which locks the locking pawl in the entry state, is assigned to the locking pawl, and that the interlocking pawl in its lifted state holds the tensioning mechanism in the relaxed state and in its entry state releases the tensioning mechanism into the tensioned state.

In various embodiments, the tensioning mechanism for generating the preload comprises a spring arrangement, such as the tensioning mechanism is preloaded into the tensioned state by the spring arrangement.

In various embodiments, the tensioning mechanism has a tensioning face, which in the tensioned state engages with a counter-tensioning face on the catch and that the preload acting on the catch is generated by the engagement between the tensioning face and the counter-tensioning face.

In various embodiments, the tensioning face and the counter-tensioning face for generating the preload interact with one another in the manner of a wedge mechanism.

In various embodiments, the engagement between the tensioning face and the counter-tensioning face is self-locking, in such a way that in the tensioned state an adjustment of the catch, currently in the main locking state, in its locking direction is prevented, or, that the engagement between the tensioning face and the counter-tensioning face is positively interlocking, in such a way that in the tensioned state a return of the catch in its locking direction is prevented.

In various embodiments, the tensioning mechanism comprises a tensioning lever, which in order to bring the tensioning mechanism into the tensioned state and the relaxed state is capable of pivoting about a tensioning lever axis, such that the tensioning lever axis can be oriented parallel to a pivot axis of the catch and/or to a pivot axis of the locking pawl.

In various embodiments, the tensioning face is arranged on the tensioning lever, such as the tensioning face, via a pivoting of the tensioning lever, can be brought into engagement with the catch in order to produce the tensioned state and disengaged from the catch in order to produce the relaxed state, and further that the tensioning lever comprises a control portion, which serves to bring the tensioning mechanism into the tensioned state and into the relaxed state.

In various embodiments, the tensioning mechanism is otherwise coupled to the motor vehicle lock in such a way that in the course of a closing process, in which the catch reaches its main locking state and the locking pawl reaches its entry state, the tensioning mechanism is in particular sprung into the tensioned state.

In various embodiments, the tensioning mechanism is otherwise coupled to the motor vehicle lock in such a way that in the course of an opening process, in which the locking pawl reaches its lifted state, the tensioning mechanism is brought into the relaxed state.

In various embodiments, an actuating mechanism is provided, by means of which the locking pawl is adjusted into its lifted state or is released into its lifted state in the course of an opening process, such that the actuating mechanism comprises an actuating lever, which is adjustable by means of a an actuating drive, in particular a motor-driven actuating drive.

In various embodiments, an assisted closing arrangement is provided, which in the course of an assisted closing process serves to drive the catch from a pre-locking state into the main locking state, that the assisted closing arrangement comprises a switch element, the actuation of which in the course of the assisted closing process produces a drive separation of the catch from the assisted closing arrangement, and that in an adjustment of the tensioning mechanism from the tensioned state into the relaxed state the tensioning mechanism actuates the switch element.

Various embodiments provide a movable element arrangement of a motor vehicle having a movable element and a motor vehicle lock assigned to the movable element as described herein.

In various embodiments, the movable element is a closing element of a motor vehicle, which can be secured in a closed position by means of the motor vehicle lock, such that the closing element is a motor vehicle door.

In various embodiments, the movable element is a seat component, in particular a seat back rest, and that the seat component can be secured in a position of use by means of the motor vehicle lock.

BRIEF DESCRIPTION OF THE DRAWINGS

The proposed solution is explained in more detail below with reference to a drawing representing only one exemplary embodiment. In the drawing.

DETAILED DESCRIPTION

Figure 1:
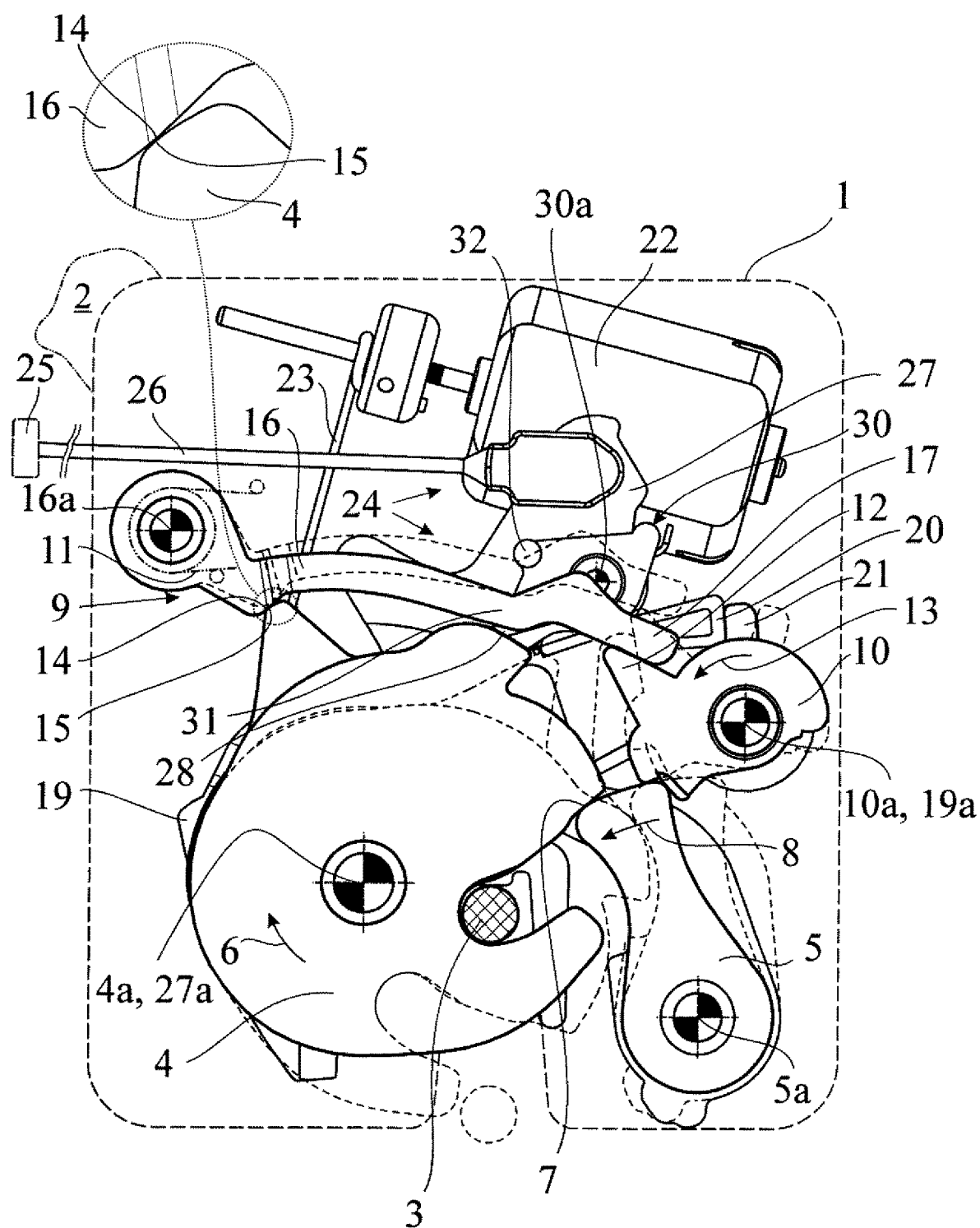
FIG. 1 shows a front view of a proposed motor vehicle lock in the main locking state.
Figure 2:
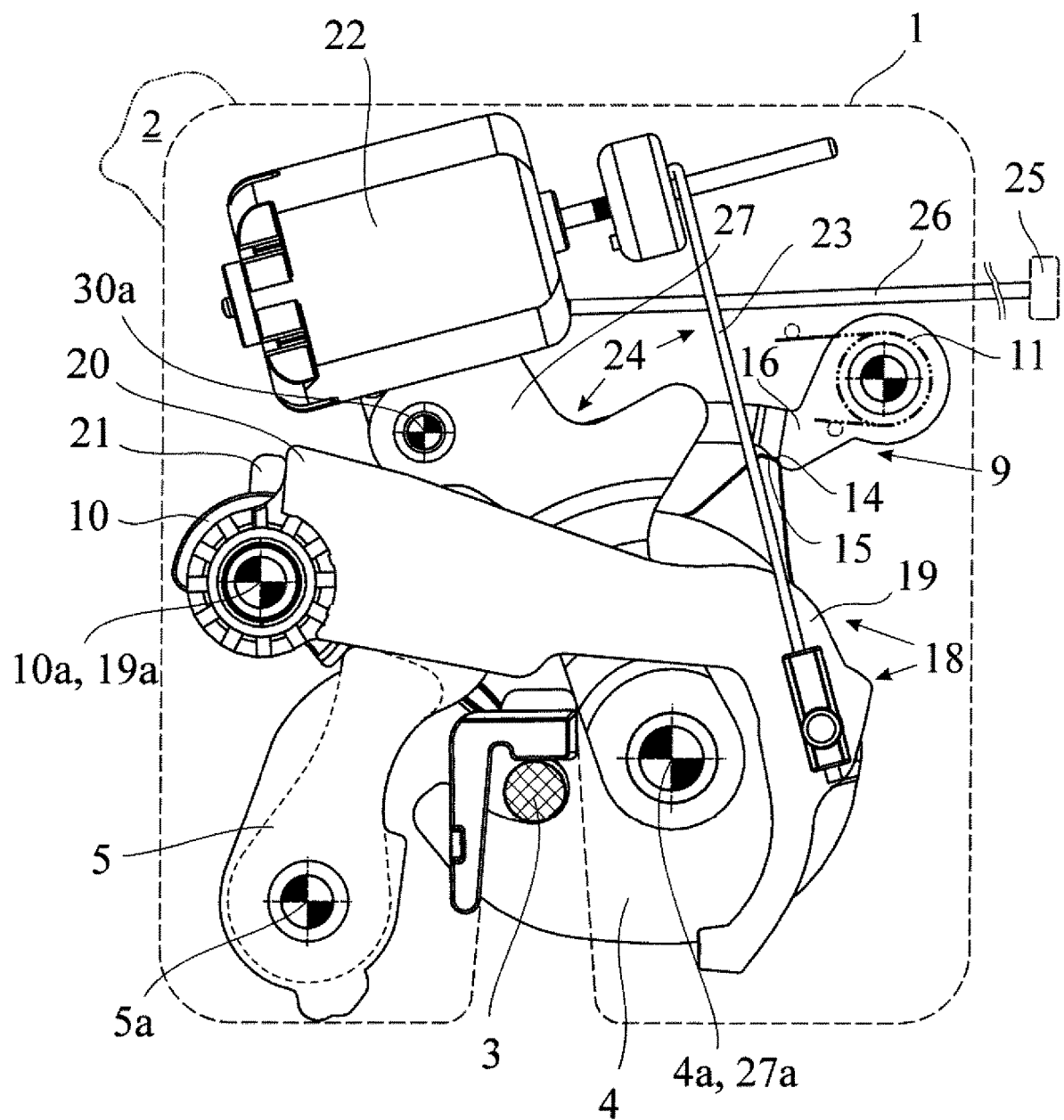
FIG. 2 shows a rear view of the motor vehicle lock according to FIG. 1.

The motor vehicle lock 1 represented in the drawing serves for securing a movable element 2 of a motor vehicle. The proposed solution is applicable to all conceivable types of movable elements of a motor vehicle. Here the proposed teaching applies primarily to a movable element 2 in the form of a motor vehicle door. All observations regarding this apply correspondingly to all other types of movable elements 2.

It must be pointed out here that the term "motor vehicle door" is to be interpreted in a wide sense. It encompasses side doors, rear doors, tailgates, rear opening hoods, engine hoods or the like.

In the fitted state the motor vehicle lock 1 interacts with a striker 3 in order to secure the movable element 2. Here the motor vehicle lock 1 can be arranged on the movable element 2, whilst the striker 3 is otherwise arranged on the motor vehicle, in particular on the motor vehicle body.

The striker 3 may be a U-shaped striker, a latch striker, a striker pin or the like.

The motor vehicle lock 1 comprises an adjustable catch 4 and an adjustable locking pawl 5 assigned to the catch 4. The catch 4 is capable of pivoting about a catch axis 4a. It can be brought at least into a main locking state (FIG. 1), into an opening state (dashed line in FIG. 1) and in some embodiments into a pre-locking state (FIG. 4), as here. In the main locking state the catch 4 is in secure engagement with the striker 3. The same applies to the pre-locking state which can be provided, as here. In the opening state the catch 4 releases the striker 3. The catch 4 is spring-preloaded in its opening direction 6. The locking pawl 5 is capable of pivoting about a locking pawl axis 5a. It can be brought into an entry state, in which it engages with the catch 4 at a point of engagement 7 and holds the catch 4 at the point of engagement 7 in the main locking state and in some embodiments also in the pre-locking state, as here (FIG. 1, 4). The locking pawl 5 can furthermore be brought into a lifted state, in which it releases the catch 4 (dashed line in FIG. 1). The locking pawl 5 is spring-preloaded in its entry direction 8.

Of fundamental importance now is the fact that the motor vehicle lock 1 comprises a tensioning mechanism 9, by means of which the catch 4 and the locking pawl 5 can be mutually tensioned at the point of engagement 7. For this purpose, with the catch 4 in the main locking state and the locking pawl 5 in the entry state, the tensioning mechanism 9 can be brought into a tensioned state, in which the tensioning mechanism 9 introduces a mechanical preload into the catch 4 in its opening direction 6. This means that the tensioning mechanism 9 exerts a torque on the catch 4 about the catch axis 4. FIG. 1 shows that this is accompanied by a corresponding bracing of the catch 4 with the locking pawl 5 at the point of engagement 7. This is shown in FIG. 1. FIG. 1, with a dashed line, shows that the tensioning mechanism 9 can be brought into a relaxed state, in which the preload originating from the tensioning mechanism 9 is reduced, or as shown, cancelled by the tensioning mechanism 9 disengaging from the catch 4. The operating principle of the tensioning mechanism 9 represented is explained in detail further below. Basically the locking pawl 5 may be a locking pawl, which in the entry state and with the catch 4 in the main locking state latches with the catch 4, so that locking pawl 5 holds itself in the entry state. This can be the case when the catch 4 is in the pre-locking state, as here. With the catch 4 in the main locking state, in the exemplary embodiment shown a torque acting on the catch in the opening direction generates a torque acting on the locking pawl 5 in the lifting direction, that is to say counter to the entry direction 8, via the point of engagement 7. Accordingly, an interlocking pawl 10, which locks the locking pawl 5 in the entry state, is assigned to the locking pawl 5.

The interlocking pawl 10 is capable of pivoting about an interlocking pawl axis 10a. It is spring-preloaded in its entry direction 13.

FIG. 1 shows that a control function for the tensioning mechanism 9 attaches to the interlocking pawl 10. In particular, the interlocking pawl 10 in its lifted state, which is represented by a dashed line in FIG. 1, holds the tensioning mechanism 9 in the relaxed state, whereas in its entry state, which is represented by a solid line in FIG. 1, the interlocking pawl 10 releases the tensioning mechanism 9 into the tensioned state. It is particularly advantageous here that the tensioning mechanism 9 comprises a spring arrangement 11 for generating the preload acting on the catch 4, the spring arrangement at the same time in an embodiment ensuring that the tensioning mechanism 9 is preloaded towards the tensioned state. Driven by the spring arrangement 11, the tensioning mechanism 9 is therefore supported on the interlocking pawl 10, so that a change in the state of the tensioning mechanism 9 can easily be brought about by an adjustment of the interlocking pawl 10. For this purpose the interlocking pawl 10 has a lug 12, which can be brought into corresponding engagement with the tensioning mechanism 9.

The tensioning mechanism 9 can include a tensioning face 14, which in the tensioned state shown by a solid line in FIG. 1 engages with a counter-tensioning face 15 on the catch 4, the proposed preload acting on the catch 4 being generated by the engagement between the tensioning face 14 and the counter-tensioning face 15. It is furthermore advantageous here that the tensioning face 14 and the counter-tensioning face 15 interact with one another in the manner of a wedge mechanism in order to generate the proposed preload.

With the proposed solution an adjustment of the catch 4 out of the main locking state represented in FIG. 1 further in the locking direction of the catch 4 is inhibited or even blocked. The catch 4 is thereby prevented from pivoting into an overtravel range, in which the catch 4 is disengaged from the locking pawl 5. This applies even in the event that the striker 3 exerts large forces on the catch 4 in its locking direction. Such forces can occur in normal driving, for example due to uneven road surfaces, which without the proposed tensioning mechanism 9 would lead to unwelcome rattling noises at the point of engagement 7.

In an embodiment the engagement between the tensioning face 14 and the counter-tensioning face 15 is self locking, in such a way that in the tensioned state a return of the catch 4 in its locking direction is prevented. This means that the tensioning mechanism 9 not only introduces a preload into the catch 4, but also locks the catch 4 to prevent the catch 4 pivoting into the overtravel range.

Alternatively the engagement between the tensioning face 14 and the counter-tensioning face 15 may be positively interlocking, in such a way that in the tensioned state a return of the catch (4) in its locking direction is prevented.

In a further alternative the engagement between the tensioning face 14 and the counter-tensioning face 15 is not self-locking, such that in the tensioned state a return of the catch 4 in its locking direction is accompanied by a corresponding return of the tensioning mechanism 9 in the direction of the relaxed state. Here the tensioning mechanism 9 therefore has a corresponding resilience, which may help to preserve materials, especially where the striker 3 acts on the catch 4 with considerable force in its locking direction.

The tensioning mechanism 9, represented in the drawing, shows a mechanically robust and at the same time compact structure. The tensioning mechanism 9 here is equipped with a tensioning lever 16, which can be pivoted about a tensioning lever axis 16a in order to bring the tensioning mechanism 9 into the tensioned state and the relaxed state. To simplify the design of the engagement with the catch 4, the tensioning lever axis 16a is oriented parallel to the pivot axis 4a of the catch 4. Since the locking pawl axis 5a can be oriented parallel to the catch axis 4a, as here, the tensioning lever axis 16a is also oriented parallel to the pivot axis 5a of the locking pawl 5. In order to preload the tensioning mechanism 9, as mentioned above, into the tensioned state, the spring arrangement 11 ensures that the tensioning lever 16 is preloaded towards the catch 4, in particular towards the counter-tensioning face 15 of the catch 4. The spring arrangement 11 can be embodied as a cylindrical helical coiled spring, as here. The tensioning face 14 of the tensioning mechanism 9 is correspondingly located on the tensioning lever 16, wherein the tensioning face 14 can be brought into engagement with the catch 4, in particular into engagement with the counter-tensioning face 15 of the catch 4, through a pivoting of the tensioning lever 16, in FIG. 1 through a clockwise pivoting of the tensioning lever 16, in order to produce the tensioned state. To produce the relaxed state, the tensioning face 14 can be correspondingly disengaged from the catch 4 by a pivoting of the tensioning lever 16, in FIG. 1 by a counter-clockwise pivoting of the tensioning lever 16.

Figure 3:
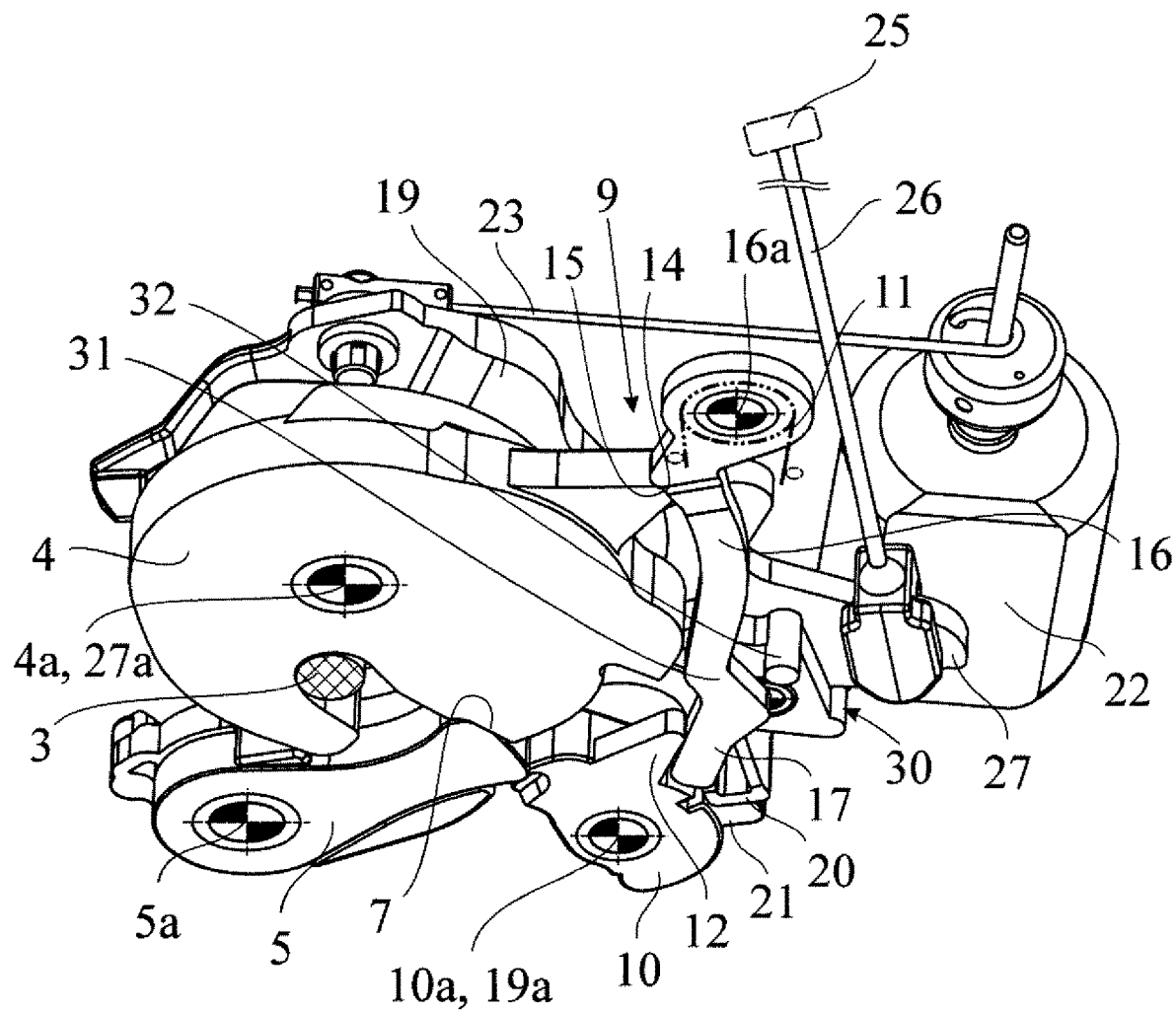
FIG. 3 shows a perspective view of the motor vehicle lock according to FIG. 1
Figure 4:
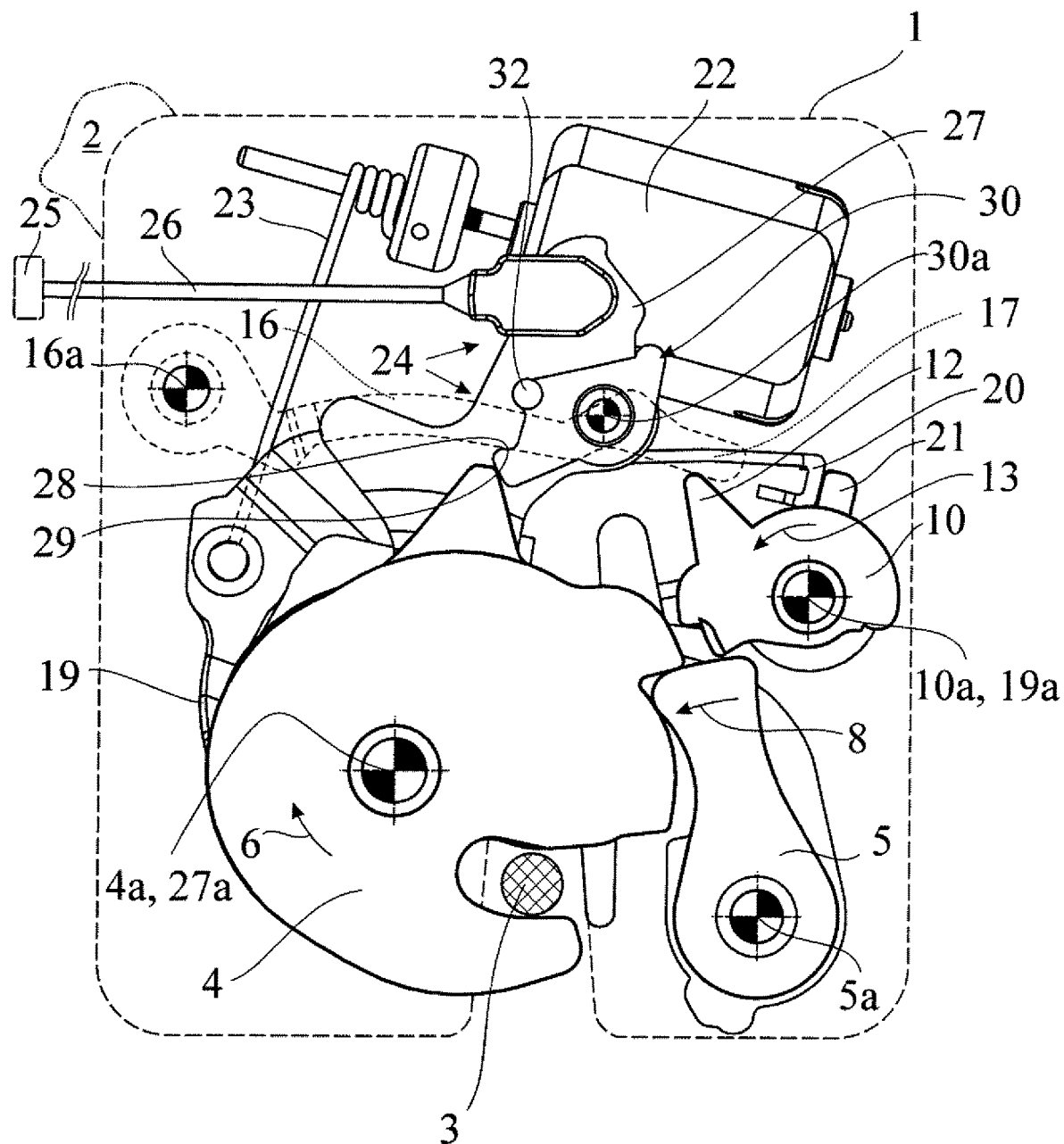
FIG. 4 shows a front view of the motor vehicle lock according to FIG. 1 in the pre-locking state.

Looking at FIGS. 1, 3 and 4 together shows that the tensioning lever 16 comprises a control portion 17, which serves to bring the tensioning mechanism 9 into the tensioned state and into the relaxed state. Here the control portion 17 is arranged in an axially remote area of the control lever 16, whereas the tensioning face 14 is arranged in an area of the control lever 16 close to the axis. The resulting leverage ratios serve to bring the tensioning lever 16 into the relaxed state with only a slight force acting on the control portion 17, even though high frictional forces might be acting between the tensioning face 14 and the counter-tensioning face 15. This effect is assisted by an elongated shape of the tensioning lever 16, which extends over the entire width of the motor vehicle lock 1, or here at any rate over the distance between the catch axis 4a and the locking pawl axis 5a.

The control portion 17, as here, can engage with the interlocking pawl 10, which via the lug 12 and against the preload of the spring arrangement 11 presses the tensioning lever 16 into the relaxed state or releases it into the tensioned state.

In general terms the tensioning mechanism 9 is otherwise coupled to the motor vehicle lock 1 in such a way that the tensioning mechanism 9 is brought into the tensioned state in the course of a locking process, in which the catch 4 reaches its main locking state and the locking pawl 5 its entry state, optionally sprung by the preload of the spring arrangement 11, as here. The tensioning mechanism 9 can fall into the tensioned state once, and possibly immediately once the locking pawl 5 has fully reached its entry state. This serves to prevent any distortion occurring between the catch 4 and the locking pawl 5 when the locking pawl 5 is only half-engaged.

When in closing the motor vehicle door, therefore, the striker 3 runs into the catch 4, upwards in FIG. 1, the catch 4 is brought from the opening state into the main locking state, so that the locking pawl 5, sprung into its entry state and thereby at the point of engagement 7, comes into engagement with the catch 4. This in turn means that the interlocking pawl 10 is sprung into its entry state, represented in FIG. 1 by a solid line, so that the lug 12 of the interlocking pawl 10 releases the tensioning lever 16 in the direction of the catch 4 and thereby in the direction of the tensioned state. The tensioning lever 16 thus moves from the position represented by a dashed line in FIG. 1 into the position represented by a solid line in FIG. 1, so that the proposed preloading of the catch 4 ensues due to the engagement between the tensioning face 14 of the tensioning lever 16 and the counter-tensioning face 15 of the catch 4.

Furthermore, in general terms the tensioning mechanism 9 is otherwise coupled to the motor vehicle lock 1 in such a way that the tensioning mechanism 9 is brought into the relaxed state in the course of an opening process, in which the locking pawl 5 reaches its lifted state. The opening process, as here, can be linked to the lifting of the interlocking pawl 10, which at the same time via the lug 12 carries the tensioning lever 16 counter-clockwise in FIG. 1 and hence the tensioning mechanism 9 into the relaxed state. This is followed by a lifting of the locking pawl 5, provided that the latter has been released by the interlocking pawl 10.

For triggering the opening process, an actuating mechanism 18 can be provided, as here, which can release the locking pawl 5 into its lifted state, as here. In particular, the actuating mechanism can comprise an actuating lever 19, as here, which via an actuating portion 20 interacts with a carrier portion 21 of the interlocking pawl 10 in such a way that the interlocking pawl 10 is brought into its lifted state by a pivoting of the actuating lever 19 about an actuating lever axis 19a, in FIG. 1 by a clockwise pivoting of the actuating lever 19. The actuating lever axis 19a can be oriented coaxially with the interlocking pawl axis 10a, as here, which allows an especially easy engagement between the actuating lever 19 and the interlocking pawl 10.

A motor-powered actuating drive can be assigned to the actuating lever 19, as here, so that adjustment of the actuating lever 19 is correspondingly motor-driven. In the exemplary embodiment represented the actuating drive comprises a drive motor 22, which is coupled to an axially remote end area of the actuating lever 19 via a flexible drive means 23, in this case via a drive cable.

Of particular importance here is the synchronization of the movements of the catch 4, locking pawl 5 and tensioning lever 16 during the opening process. In the design of the motor vehicle lock 1 particular care has to be taken to ensure that the tensioning lever 16 drops towards the tensioned state only when the engagement between catch 4 and locking pawl 5 has already come about at the point of engagement 7. This can be achieved through suitable balancing of the spring preloads and the inertial masses of the components involved.

A noteworthy finding in the case of the motor vehicle lock 1 represented is that the aforementioned elongated shape of the tensioning lever 16 can in principle also be used for other functions in the motor vehicle lock. This relates here to an assisted closing function of the motor vehicle lock, here accomplished by the provision of an assisted closing arrangement 24. The assisted closing function can be achieved by a motor-powered assisted closing drive 25, as here, which can be provided, as here, as a drive unit disengaged separately from the motor vehicle lock 1. Here the assisted closing drive 25 is coupled to the assisted closing arrangement 24 by a Bowden cable 26. In principle the assisted closing drive 25 may also be an integral part of the motor vehicle lock 1.

In the course of an assisted closing process the catch can be driven out of the pre-locking state represented in FIG. 4 into the main locking state represented in FIG. 1. For this purpose the assisted closing arrangement 24 is equipped with an assisted closing lever 27, which is capable of pivoting about an assisted closing lever axis 27a. The assisted closing lever axis 27a, as here, can be oriented coaxially with the catch axis 4a. In the course of the assisted closing process an actuating portion 28 of the assisted closing lever 27 comes into engagement with a carrier portion 29 of the catch 4, so that the assisted closing lever 27, driven via the assisted closing drive 25 and the Bowden cable 26, brings the catch 4 into the main locking state represented in FIG. 1. Of interest here is the fact that the assisted closing arrangement 24 comprises a switch element 30, which provides the actuating portion 28. The switch element 30 is otherwise articulated about a switch element axis 30a on the assisted closing lever 27 and spring-preloaded in the direction of engagement with the carrier portion 29 of the catch 4.

Should an opening process be triggered by the actuating mechanism 18 in the course of the assisted closing process, for example due to jamming, the tensioning lever 16 as mentioned above is brought into the relaxed state, which is linked to a swiveling of the tensioning lever 16 in the counter-clockwise direction in FIG. 4. An actuating portion 31 on the tensioning lever 16 thereby comes into engagement with a carrier portion 32 on the switch lever 30, resulting in actuation of the switch lever 30, in particular to a pivoting of the switch lever 30 on the assisted closing lever 27, clockwise in FIG. 4. This actuation of the switch lever in the course of the assisted closing process produces a drive separation of the catch 4 from the assisted closing arrangement 24 by disengaging the actuating portion 28 of the assisted closing lever 27 from the carrier portion 29 of the catch 4. As explained above, the actuation of the switch element 30 originates from an adjustment of the tensioning mechanism 9 from the tensioned state into the relaxed state. In this respect the tensioning mechanism 9, in this case the tensioning lever 16, is used in addition for actuation of the switch lever 30 of the assisted closing arrangement 24, which in design terms is advantageously easy to achieve due to the elongated arrangement of the tensioning lever 16, likewise already mentioned. The actuating portion 31 of the tensioning lever 16 is advantageously situated, as here, at a point on the tensioning lever 16 between the tensioning face 14 close to the axis and the control portion 17 remote from the axis.

According to a further teaching, a movable element arrangement of a motor vehicle is provided, which is equipped with a movable element 2 and a proposed motor vehicle lock 1, assigned to the movable element 2. Reference is made to all observations concerning the motor vehicle lock 1 which are appropriate in explaining the movable element arrangement.

In an embodiment the movable element 2 is a closing element of a motor vehicle which can be secured in a closed position by means of the motor vehicle lock 1. The closing element here can be a motor vehicle door, the term "motor vehicle door" being interpreted in a wide sense, as explained above.

Alternatively, the movable element may also be a seat component, in particular a seat back, of a motor vehicle. Here the seat component may be secured in a position of use, in particular in a substantially upright seat position, by means of the motor vehicle lock 1. Here the proposed solution presents itself as a particularly advantageous solution, since in service the removable structure of a seat back introduces fundamentally abrupt load stresses into the motor vehicle lock securing the seat back, which is accompanied by a corresponding tendency to rattle. The proposed motor vehicle lock 1 serves effectively to reduce this tendency to rattle through the bracing of the catch 4 and the locking pawl 5.

The invention claimed is:

1. A motor vehicle lock for securing a movable element of a motor vehicle, wherein the motor vehicle lock in the fitted state interacts with a striker in order to secure the movable element, wherein the motor vehicle lock comprises an adjustable catch and an adjustable locking pawl assigned to the catch, wherein the catch is adjustable into a main locking state, in which it is in secure engagement with the striker, and into an opening state, in which it releases the striker, wherein the locking pawl is adjustable into an entry state, in which it engages with the catch at a point of engagement, and holds the catch in the main locking state at the point of engagement, and into a lifted state, in which it releases the catch, wherein the catch is spring-preloaded in its opening direction, wherein the motor vehicle lock comprises a tensioning mechanism, wherein the tensioning mechanism has a tensioned state, in which the tensioning mechanism introduces a mechanical preload into the catch in its opening direction, wherein the mechanical preload of the tensioning mechanism introduced into the catch is independent of the spring-preload acting on the catch, wherein the tensioning mechanism has a relaxed state, in which the preload originating from the tensioning mechanism is reduced or cancelled, wherein when the catch is in the main locking state and the locking pawl is in the entry state the tensioning mechanism is configured to be brought into the tensioned state and, wherein when the catch is in the main locking state and the locking pawl is in the entry state the tensioning mechanism is configured to be brought into the relaxed state.

2. The motor vehicle lock as claimed in claim 1, wherein with the catch in the main locking state a torque generated by the tensioning mechanism acting on the catch in the opening direction via the point of engagement generates a torque acting on the locking pawl in a lifting direction and that an interlocking pawl, which locks the locking pawl in the entry state, is assigned to the locking pawl, and that the interlocking pawl in its lifted state holds the tensioning mechanism in the relaxed state and in its entry state releases the tensioning mechanism into the tensioned state.

3. The motor vehicle lock as claimed in claim 1, wherein the tensioning mechanism for generating the preload comprises a spring arrangement.

4. The motor vehicle lock as claimed in claim 3, wherein the tensioning mechanism is preloaded into the tensioned state by the spring arrangement.

5. The motor vehicle lock as claimed in claim 1, wherein the tensioning mechanism has a tensioning face, which in the tensioned state engages with a counter-tensioning face on the catch and wherein the preload acting on the catch is generated by the engagement between the tensioning face and the counter-tensioning face.

6. The motor vehicle lock as claimed in claim 5, wherein the tensioning face and the counter-tensioning face for generating the preload interact with one another in the manner of a wedge mechanism.

7. The motor vehicle lock as claimed in claim 5, wherein the engagement between the tensioning face and the counter-tensioning face is self-locking, in such a way that in the tensioned state an adjustment of the catch, currently in the main locking state, in its locking direction is prevented, or, wherein the engagement between the tensioning face and the counter-tensioning face is positively interlocking, in such a way that in the tensioned state a return of the catch in its locking direction is prevented.

8. The motor vehicle lock as claimed in claim 5, wherein the tensioning face is arranged on the tensioning lever, and wherein the tensioning face, via a pivoting of the tensioning lever, is configured to be brought into engagement with the catch in order to produce the tensioned state and disengaged from the catch in order to produce the relaxed state.

9. The motor vehicle lock as claimed in claim 8, wherein the tensioning lever comprises a control portion, which serves to bring the tensioning mechanism into the tensioned state and into the relaxed state.

10. The motor vehicle lock as claimed in claim 1, wherein the tensioning mechanism comprises a tensioning lever, which in order to bring the tensioning mechanism into the tensioned state and the relaxed state is capable of pivoting about a tensioning lever axis.

11. The motor vehicle lock as claimed in claim 10, wherein the tensioning lever axis is oriented parallel to a pivot axis of the catch and/or to a pivot axis of the locking pawl.

12. The motor vehicle lock as claimed in claim 1, wherein the tensioning mechanism is otherwise coupled to the motor vehicle lock in such a way that in the course of a closing process, in which the catch reaches its main locking state and the locking pawl reaches its entry state, the tensioning mechanism is sprung into the tensioned state.

13. The motor vehicle lock as claimed in claim 1, wherein the tensioning mechanism is otherwise coupled to the motor vehicle lock in such a way that in the course of an opening process, in which the locking pawl reaches its lifted state, the tensioning mechanism is brought into the relaxed state.

14. The motor vehicle lock as claimed in claim 1, further comprising an actuating mechanism, by which the locking pawl is adjusted into its lifted state or is released into its lifted state in the course of an opening process.

15. The motor vehicle lock as claimed in claim 14, wherein the actuating mechanism comprises an actuating lever, which is adjustable by an actuating drive.

16. The motor vehicle lock as claimed in claim 1, further comprising an assisted closing arrangement, which in the course of an assisted closing process serves to drive the catch from a pre-locking state into the main locking state, wherein the assisted closing arrangement comprises a switch element, the actuation of which in the course of the assisted closing process produces a drive separation of the catch from the assisted closing arrangement, and wherein in an adjustment of the tensioning mechanism from the tensioned state into the relaxed state the tensioning mechanism actuates the switch element.

17. A movable element arrangement of a motor vehicle comprising a movable element and a motor vehicle lock assigned to the movable element as claimed in claim 1.

18. The movable element arrangement as claimed in claim 17, wherein the movable element is a closing element of a motor vehicle, which is configured to be secured in a closed position by the motor vehicle lock.

19. The movable element arrangement as claimed in claim 17, wherein the movable element is a seat component and that the seat component is configured to be secured in a position of use by the motor vehicle lock.

20. The movable element arrangement as claimed in claim 18, wherein the closing element is a motor vehicle door.

* * * * *